(12) United States Patent
Novak et al.

(10) Patent No.: US 9,199,321 B2
(45) Date of Patent: Dec. 1, 2015

(54) DOUBLE SIDED HAND HACK SAW BLADE AND METHOD OF MANUFACTURE

(71) Applicants: Joseph T. Novak, East Longmeadow, MA (US); William B. Korb, Broad Brook, CT (US)

(72) Inventors: Joseph T. Novak, East Longmeadow, MA (US); William B. Korb, Broad Brook, CT (US)

(73) Assignee: Irwin Industrial Tool Company, Huntersville, NC (US)

( * ) Notice: Subject to any disclaimer, the term of this patent is extended or adjusted under 35 U.S.C. 154(b) by 247 days.

(21) Appl. No.: 13/799,546

(22) Filed: Mar. 13, 2013

(65) Prior Publication Data

US 2014/0000117 A1  Jan. 2, 2014

Related U.S. Application Data

(60) Provisional application No. 61/666,724, filed on Jun. 29, 2012.

(51) Int. Cl.
*B27B 33/02* (2006.01)
*B23D 61/12* (2006.01)
*B23P 15/28* (2006.01)
*B23D 65/04* (2006.01)

(52) U.S. Cl.
CPC ............ *B23D 61/126* (2013.01); *B23D 61/121* (2013.01); *B23D 65/04* (2013.01); *B23P 15/28* (2013.01)

(58) Field of Classification Search
CPC .... B23D 61/121; B23D 61/126; B23D 65/04; B23P 15/28
See application file for complete search history.

(56) References Cited

U.S. PATENT DOCUMENTS

| 336,697 | A | | 2/1886 | Clemson | |
|---|---|---|---|---|---|
| 417,404 | A | | 12/1889 | Clemson | |
| 603,128 | A | * | 4/1898 | Clemson | 83/850 |
| 865,348 | A | * | 9/1907 | Allison | 30/502 |
| 1,381,478 | A | * | 6/1921 | Lawrence | 83/851 |
| 1,434,295 | A | | 10/1922 | Lang | |
| 1,882,328 | A | | 10/1932 | Kinkel | |
| 2,045,105 | A | | 6/1936 | Salvador | |
| D130,056 | S | | 10/1941 | Burton | |
| 2,306,187 | A | | 12/1942 | Ronan | |
| 2,331,638 | A | | 10/1943 | Taylor | |
| 2,365,301 | A | | 12/1944 | Shortell | |
| 2,403,027 | A | | 7/1946 | Shoultz | |

(Continued)

FOREIGN PATENT DOCUMENTS

| DE | 611 898 | * | 4/1935 |
|---|---|---|---|
| DE | 897 006 | * | 7/1949 |

(Continued)

*Primary Examiner* — Hwei C Payer
(74) *Attorney, Agent, or Firm* — Sutherland Asbill & Brennan LLP

(57) ABSTRACT

A double-sided saw blade, such as a hack saw blade, comprising a blade body defining a first end and a second end; a first cutting edge located on one side of the blade body defining a first cutting tooth set pattern and a second cutting edge located on an opposite side of the blade body defining a second cutting tooth set pattern; wherein the first set pattern and the second set pattern are (i) timed with respect to one another or (ii) 180 degrees out of phase with respect to one another. A first tooth of the first set pattern may be indexed relative to a designated reference point along the blade body and a first tooth of the second set pattern may be equally indexed relative to the same designated reference point along the blade body.

24 Claims, 3 Drawing Sheets

(56) References Cited

U.S. PATENT DOCUMENTS

| | | | |
|---|---|---|---|
| 2,695,641 A | 11/1954 | Behr | |
| 2,988,123 A | 6/1961 | Dickstein | |
| D204,671 S | 5/1966 | McEvoy | |
| 3,292,674 A * | 12/1966 | Turner | 83/848 |
| D240,009 S | 5/1976 | Breger | |
| D249,116 S | 8/1978 | Vanderbloemen | |
| RE31,433 E * | 11/1983 | Clark | 83/846 |
| D275,442 S | 9/1984 | Hayes | |
| 4,557,172 A * | 12/1985 | Yoneda | 83/848 |
| D302,232 S | 7/1989 | Hoffman et al. | |
| 4,920,652 A | 5/1990 | Johnson | |
| 4,958,546 A * | 9/1990 | Yoshida et al. | 83/848 |
| 5,062,338 A | 11/1991 | Baker | |
| 5,074,002 A | 12/1991 | Huang | |
| 5,501,129 A * | 3/1996 | Armstrong et al. | 83/848 |
| D405,667 S | 2/1999 | Rivera | |
| 5,918,525 A * | 7/1999 | Schramm | 83/835 |
| D428,321 S | 7/2000 | Ranieri et al. | |
| D450,552 S | 11/2001 | Mason | |
| D479,106 S | 9/2003 | Robertsson | |
| D485,142 S * | 1/2004 | Rack | D8/20 |
| D516,394 S | 3/2006 | Chen | |
| D579,291 S | 10/2008 | Himbert et al. | |
| 7,806,033 B2 * | 10/2010 | Kocher et al. | 83/835 |
| D651,490 S | 1/2012 | Buonfiglio | |
| 2002/0144411 A1 | 10/2002 | Brooks | |
| 2004/0035282 A1* | 2/2004 | Tsujimoto | 83/849 |
| 2007/0251372 A1* | 11/2007 | Petts et al. | 83/846 |

FOREIGN PATENT DOCUMENTS

| | | |
|---|---|---|
| DE | 10 2007 044 169 A1 * | 3/2009 |
| FR | 1 027 152 * | 5/1953 |
| GB | 1 359 158 * | 7/1974 |

* cited by examiner

DOUBLE SIDED HAND HACK SAW BLADE AND METHOD OF MANUFACTURE

CROSS REFERENCE TO RELATED APPLICATIONS

This application claims the benefit under 35 U.S.C. §119 (e) of similarly-titled U.S. Provisional Application No. 61/666,724, filed Jun. 29, 2012, the content of which is incorporated by reference in its entirety as if fully set forth herein.

FIELD OF THE INVENTION

The present invention relates to saw blades, and more particularly, to hand hack saw blades having cutting edges on both sides of the blade.

BACKGROUND OF THE INVENTION

Typical prior art hack saw blades include a blade body having a single cutting edge defined by a plurality of teeth axially spaced relative to each other along one side of the blade body, and a non-working edge formed on an opposite side of the blade body relative to the cutting edge. Because typical prior art hack saw blades include only a single cutting edge, fundamental limitations persist. The single cutting edge can wear out, or wear out quicker than desired, or even fracture, thereby requiring disposal of the entire blade. The cost of manufacture and materials may also be unnecessarily high for only a single cutting edge.

Double sided hack saw blades have been made in an attempt to solve this problem. Having a second cutting edge to use after the first cutting has worn out potentially provides a user with increased blade life. Moreover, the additional cost of manufacture to include the second cutting edge along the previously non-working edge of the blade body (and consequently purchase cost to a user) is favorable relative to the increased blade life, thereby providing more cost effective blades.

However, while one might expect that a double sided hack saw blade would provide about double the blade life, this is often not the case. The second-used side of the blade often wears out quicker than the first-used side of the blade. In addition, the blade can fracture prior to the second-used side wearing out. In such cases, the cost effectiveness of the blade is reduced.

Accordingly, it is an object of the present invention to overcome one or more of the above-described drawbacks and/or disadvantages of the prior art.

SUMMARY OF THE INVENTION

In accordance with a first aspect, the present invention is directed to a double-sided hand hack saw blade comprising a blade body defining a first end and a second end. A first cutting edge defined by a plurality of cutting teeth is located on one side of the blade body and defines a first tooth set pattern. A second cutting edge defined by a plurality of cutting teeth is located on an opposite side of the blade body relative to the one side of the blade body and defines a second tooth set pattern. The first tooth set pattern and the second tooth set pattern are (i) timed to each other or (ii) approximately 180 degrees out of phase with respect to one another.

In some embodiments of the present invention, the first and second tooth set patterns define wavy tooth set patterns. In some such embodiments, the location of each tooth on the first cutting edge relative to a reference point on the blade body is in time with the location of each corresponding tooth on the second cutting edge relative to said reference point on the blade body. In some embodiments, the first cutting edge defines a first tooth pitch or tooth location, the second cutting edge defines a second tooth pitch or tooth location, the first tooth wavy set pattern is timed to the first tooth pitch or tooth location, the second tooth wavy set pattern is timed to the second tooth pitch or tooth location, and the first tooth wavy set pattern is timed to the second tooth wavy set pattern.

In some embodiments of the present invention, the first cutting edge defines a plurality of first points of maximum set magnitude axially spaced relative to each other, the second cutting edge defines a plurality of second points of maximum set magnitude axially spaced relative to each other, and each first point of maximum set magnitude is either aligned with or approximately 180 degrees out of phase with a respective second point of maximum set magnitude. In some such embodiments, the first cutting edge defines a plurality of first points of maximum right set magnitude axially spaced relative to each other and a plurality of first points of maximum left set magnitude axially spaced relative to each other. The second cutting edge defines a plurality of second points of maximum right set magnitude axially spaced relative to each other and a plurality of second points of maximum left set magnitude axially spaced relative to each other. Each first point of maximum right set magnitude is either aligned with or approximately 180 degrees out of phase with a respective second point of maximum right set magnitude. Each first point of maximum left set magnitude is either aligned with or approximately 180 degrees out of phase with a respective second point of maximum left set magnitude.

In some embodiments of the present invention, the first cutting edge defines a first wavy set pattern to tooth pitch timing, the second cutting edge defines a second wavy set pattern to tooth pitch timing, and the first wavy set pattern to tooth pitch timing is approximately the same as the second way set pattern to tooth pitch timing. In some such embodiments, a first tooth of the first wavy set pattern is indexed a first distance with respect to a reference point on the blade, a first tooth of the second wavy set pattern is indexed a second distance with respect to said reference point on the blade, and the first distance is approximately equal to the second distance to thereby time the first wavy set pattern to tooth pitch, time the second wavy set pattern to tooth pitch, and set such timing on the first and second sides of the blade approximately equal to each other.

In some embodiments of the present invention, the blade is tri-metal. In some such embodiments, the blade body is formed of spring steel and the first and second cutting edges are formed of high speed steel. In some such embodiments, the spring steel defines a hardness within the range of about HRc 38 and about HRc 48, and the high speed steel defines a hardness within the range of about HRc 60 and about HRc 68.

In some embodiments of the present invention, the first cutting edge defines a first tooth pitch within the range of about 18 teeth-per-inch and about 24 teeth-per-inch, and the second cutting edge defines a second tooth pitch substantially equal to the first tooth pitch.

In accordance with another aspect, the present invention is directed to a double-sided hand hack saw blade comprising a blade body defining a first end and a second end. First means for cutting are located on one side of the blade body defining a first wavy set pattern and second means for cutting are located on an opposite side of the blade body defining a second wavy set pattern. The first wavy set pattern and the second wavy set pattern are either (i) timed with each other or (ii) approximately 180 degrees out of phase with respect to one another.

In some embodiments of the present invention, the first means is a first cutting edge defined by a plurality of cutting teeth defining a first wavy set pattern, and the second means is a second cutting edge defined by a plurality of cutting teeth defining a second wavy set pattern. In some embodiments of the present invention, the first means includes third means for cutting located along the first means indexed to a designated reference point along the blade body, and the second means includes fourth means for cutting located along the second means that is equally indexed to the same designated reference point along the blade body. In some such embodiments, the first means is a first cutting edge, the second means is a second cutting edge, the third means is a first tooth of the first set pattern, and the fourth means is a first tooth of the second set pattern.

In accordance with another aspect, the preset invention is directed to a method comprising the steps of:
  (i) mounting at least one blade body in a milling fixture;
  (ii) milling first and second cutting edges defined by a plurality of teeth along opposing edges of the at least one blade body;
  (iii) removing the at least one blade from the milling fixture and placing the at least one blade into a setting die; and
  (iv) substantially simultaneously setting the teeth on the first and second cutting edges and, in turn, forming a first tooth set pattern of teeth on the first cutting edge and a second tooth set pattern of teeth on the second cutting edge.

Some embodiments of the present invention further comprise forming a plurality of blade bodies in separate piece form, wherein each separate piece defines a respective blade body. In some such embodiments, the step of forming a plurality of blade bodies comprises forming each blade body piece from a tri-metal strip, and the step of forming the at least one blade body from the metal strip comprises die cutting the at least one blade body from the strip. The method preferably further comprises forming the tri-metal strip with a spring steel center portion and opposing high speed steel edges.

In some embodiments of the present invention, the setting step comprises setting the first and second cutting edges such that the first tooth set pattern and the second tooth set pattern are (i) timed with each another or (ii) approximately 180 degrees out of phase with respect to one another. In some embodiments of the present invention, the setting step comprises forming a first wavy set pattern of teeth on the first cutting edge and a second wavy set pattern on the second cutting edge.

In some embodiments of the present invention, the milling step comprises milling the first cutting edge along a first side of the at least one blade body, flipping the milling fixture, and milling the second cutting edge along an opposing second side of the at least one blade body. In some such embodiments, the step of milling the first cutting edge comprises (i) indexing a first tooth of the plurality of teeth of the first cutting edge relative to a designated reference point along the at least one blade body, and (ii) equally indexing a first tooth of the plurality of teeth of the second cutting edge relative to the same reference point along the at least one blade body.

In some embodiments of the present invention, the setting step comprises seating the at least one blade in a first die and stamping the at least one blade in the first die with a second die that cooperates with the first die and substantially simultaneously sets the first and second cutting edges with a single stroke to create the first and second tooth set patterns.

One advantage of the present invention is that the double-sided blade will provide increased, about double, the blade life as compared to single-sided hack saw blades. Another advantage of the present invention is that the timing of the teeth along the first and second cutting edges will aid in stabilizing the blade, resulting in better cutting efficiency and tooth wear, and improved quality of the cut. Another advantage is that setting the teeth on opposite sides of the blade to substantially the same maximum set magnitude, and locating the points of maximum set magnitude on opposite sides of the blade so they are either timed with each other or about 180 degrees out of phase with each other, provides uniform tooth wear and can significantly improve blade life in comparison to prior art blades.

Other objects and advantages of the present invention, and/or of the currently preferred embodiments thereof, will become more readily apparent in view of the following detailed description of the currently preferred embodiments and accompanying drawings.

DETAILED DESCRIPTION OF EMBODIMENTS OF THE INVENTION

Figure 1:
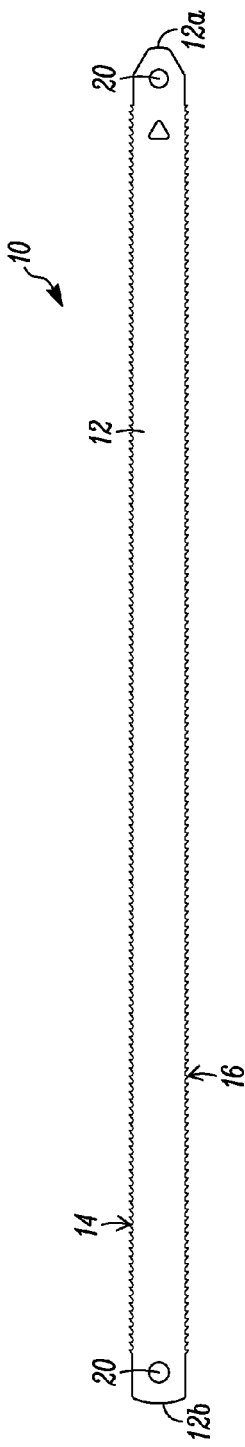
FIG. 1 is a side view of the double-sided hack saw blade, wherein the blade includes a first cutting edge located on one side of the blade and a second cutting edge located on an opposite side of the blade.
Figure 2:
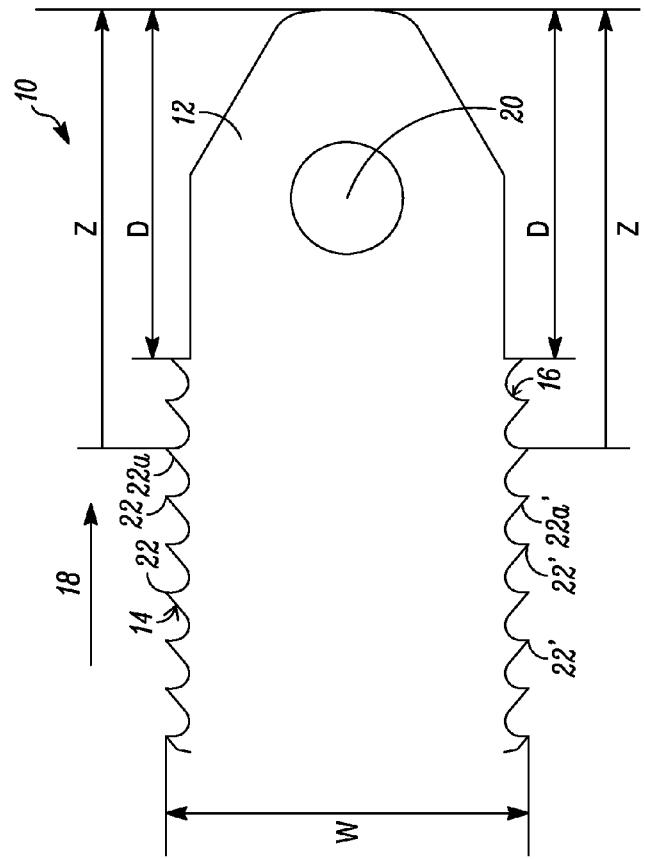
FIG. 2 is an partial, enlarged side view of the double-sided hack saw blade of FIG. 1 illustrating in further detail exemplary cutting teeth of the first and second cutting edges of the blade.

In FIGS. 1 and 2, a double-sided hand hacksaw blade is indicated generally by the reference numeral 10. The blade 10 includes a blade body 12, defining a first end 12a and a second end 12b. The blade 10 further defines a first cutting edge 14 defined by a plurality of teeth 22 extending along one side of the blade body 12 between the first and the second ends 12a, 12b of the blade body, and a second cutting edge 16 defined by a plurality of teeth 22' located on the opposite side of the blade body 12 relative to the first cutting edge 14. In the illustrated embodiment, and as described further below, the first and second cutting edges 14, 16 extend along substantially the entire length of the blade body 12, i.e., from approximately one end 12a of the blade body 12 to the opposite end 12b of the blade body 12. The first and second cutting edges 14, 16 define a cutting direction indicated by the first arrow 18. As may be recognized by those of ordinary skill in the pertinent art based on the teachings herein, the orientation, shape and/or configuration of the cutting edges 14, 16 may vary as needed to accomplish different cutting applications or otherwise as desired. The blade body 12 includes a pair of spaced apertures 20 at the opposing ends of the blade, for releasably securing the blade 10 to a hack saw (not shown). In the illustrated embodiment, the apertures 20 are located toward the ends 12a, 12b of the blade body 12 in a portion without any teeth. However, in other embodiments, the portions in which the apertures 20 are located can have teeth.

As shown in FIG. 2, each of the cutting edges 14, 16 that define a plurality of cutting teeth 22, 22', respectively, are configured substantially the same. In other embodiments, they can be configured differently or for different cutting applications. As may be recognized by those of ordinary skill in the pertinent art based on the teachings herein, the teeth 22, 22' are configured for their respective cutting application(s) based on, for example, the particular tooth geometries or forms (such as by setting the primary, and if applicable, secondary and/or tertiary, clearance angles), the pitch or number of teeth-per-inch ("tpi"), and/or the teeth heights or height differentials and/or sets.

Figure 3A:
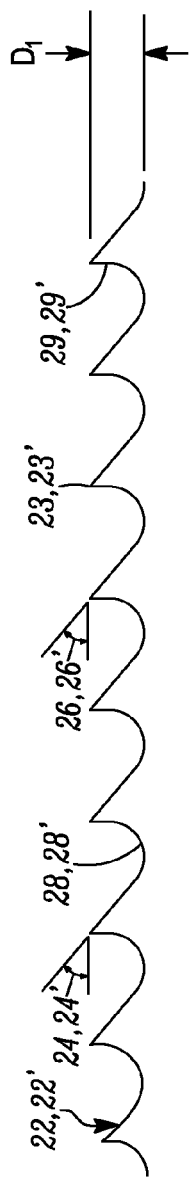
FIG. 3A is an enlarged side view of a portion of a cutting edge of the double-sided hack saw blade of FIG. 1.

In the illustrated embodiment, both the first and second cutting edges 14, 16 are configured for the same cutting application and thus define the same pitch. Exemplary pitches are within the range of about 18 teeth-per-inch and about 24 teeth-per-inch. As shown typically in FIG. 3A, the teeth 22, 22' each define a tooth tip, 23, 23', a primary clearance angle 24, 24', a secondary clearance angle 26, 26', a gullet 28, 28', a gullet depth D1 measured perpendicularly between the tooth tip 23, 23' and the bottom of the gullet 28, 28', and a rake face 29, 29' between the tooth tip 23, 23' and the gullet 28, 28'. The rake face 29, 29' defines a rake angle. In the illustrated embodiment, the rake angle is approximately zero. In other embodiments the rake angle is positive or negative, as fits the particular cutting application. Each clearance angle is an acute angle, and, in the illustrated embodiment, the primary clearance angle is less than the secondary clearance angle. As may be recognized by those of ordinary skill in the pertinent art based on the teachings herein, these particular tooth forms are only exemplary, and may take any of numerous different tooth forms, including any of numerous different clearance angles or differentials between the primary and secondary clearance angles (e.g., the secondary angle being less than the primary clearance angle) and other dimensions that are currently known, or that later become known.

In the illustrated embodiment, the blade 10 is formed of tri-metal, including a spring steel backing (center portion), and opposing high speed steel edges welded thereon in a known manner, forming the first and second cutting edges 14, 16, respectively. The spring steel backing provides the blade 10 with resiliency to avoid premature blade fracture prior to full usage of both cutting edges, while the high speed edges provide strength and wear-resistance for cutting. The spring steel backing defines a hardness that is within the range of about HRc 38 and about HRc 48. Each high speed steel edge defines a hardness that is within the range of about HRc 60 and about HRc 68. The blade 10 defines a width and a thickness. In some embodiments, the thickness of the blade 10 is within the range of about 0.022 inch and 0.026 inch, such as within the range of about 0.022 inch and 0.024 inch. However, as may be recognized by those of ordinary skill in the pertinent art based on the teachings herein, the blade 10 may be made of any of numerous different materials, widths and thicknesses, currently known or that later become known, capable of performing the function of the tri-metal blade as described herein. Additionally, the blade 10 may be more or less than tri-metal depending upon the desired usage and functionality. Further, the above-described dimensions/measurements are only exemplary, and may be set or changed as desired or otherwise required depending upon the specific cutting application.

Figure 3B:
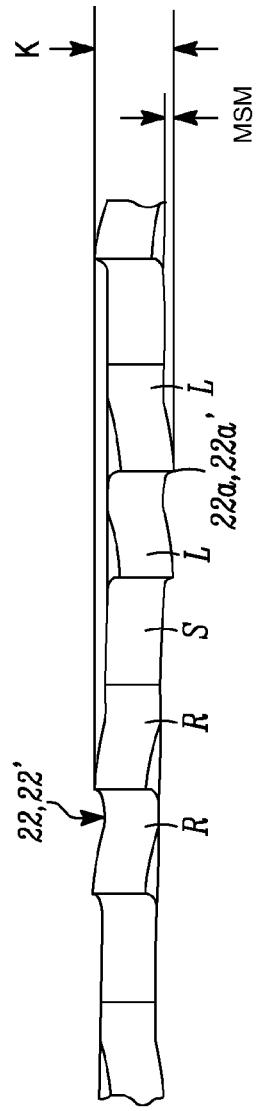
FIG. 3B is a top view of the portion of the cutting edge shown in FIG. 3A.

The first and second cutting edges 14, 16 define set patterns. As seen in FIG. 3B, they define a repeating "wavy" set pattern including two right set teeth R, R followed by an unset tooth S, which is in turn followed by two left set teeth L, L. However, as should be recognized by those of ordinary skill in the pertinent art based on the teachings herein, the first and second cutting edges 14, 16 may define any of numerous other set patterns, currently known or that later become known, according to the desired cutting application of the blade 10. For example, they may define a "short wavy" pattern, which is similar to the above-described "wavy" pattern but without an unset tooth. Each cutting edge 14, 16 may define a "raker" set pattern, such as, for example, a right set tooth R, followed by an unset tooth S, which is in turn followed by a left set tooth L. In yet other embodiments, the teeth or groups of teeth are not set. Additionally, the first and second cutting edges may define different set patterns from one another to provide a more versatile blade.

In the illustrated embodiment, the first and second cutting edges 14, 16 define the same set pattern. As shown in FIG. 3B. each left or right set tooth L, R, in the set pattern defines a maximum set magnitude "MSM" to the left or right, respectively, that is within the range of about 0.005 ($5/1000$) inch and about 0.008 ($8/1000$) inch. The teeth S are straight, or unset. The total set "K" of the blade 10 is twice the maximum set magnitude "MSM" plus the blade thickness. The total set "K" defines the width of the cut, i.e., the kerf, made in a work piece. It should be understood, though, that the set teeth can have different set magnitudes from each other. For example, the first set tooth L can be relatively light set and the second set tooth L can be relatively heavy set, i.e., set to a greater magnitude than the first set tooth L, or vice versa.

In the illustrated embodiment, the teeth have substantially the same height, e.g., as measured perpendicularly from a plane intersecting the blade to the tips 23, 23' of the teeth 22, 22'. In other embodiments, the teeth can have different heights. By way of example, the unset tooth S can define a relatively high tooth, and the set teeth can define relatively low teeth that are not as high (before any set) as the relatively high teeth. In some such embodiments, the relatively low teeth define different heights from each other. Those of ordinary skill in the art should understand, though, that the teeth may define any pattern, sequence, or non sequence of differing heights depending upon the cutting application. Examples of cutting edges with teeth of varying heights and sets are shown and described in U.S. patent application Ser. No. 11/963,474, filed Dec. 27, 2007, now U.S. Pat. No. 8,210, 081, entitled "Reciprocating Saw Blade Having Variable-Height Teeth and Related Method," which claims the benefit of similarly titled U.S. Provisional Patent Application Serial No. 60/934,262, filed Jun. 12, 2007, which are hereby incorporated by reference as if fully set forth herein.

The inventors have discovered that improved blade life and cutting efficiency is achieved if both cutting edges are the same. This will allow a user to flip the blade over when the first cutting edge has worn out and continue making the same cuts through a work piece with the second cutting edge.

Furthermore, the inventors have discovered that if the set patterns and set magnitudes of the two cutting edges of the blade are the same (or mirror images of one another), then the blade will have improved cutting effectiveness and wear. It is believed that, with such arrangements, teeth along the "non-cutting" cutting edge will help to support the teeth that are cutting the work piece on the opposing side of the blade against reaction forces, vibrations and blade movements applied to the cutting edge and blade by the work piece, thereby stabilizing the blade and improving cutting. Aligning corresponding cutting teeth on opposing sides of the blade body with respect to a reference point on the blade, i.e., machining opposing teeth at the same point or location along the length of the blade relative to the reference point or plane, also provides increased cutting support and effectiveness.

The invention thus differs from prior art double-sided hack saw blades, in which no such matching or alignment between the opposing cutting edges is provided. Therefore, the teeth on opposing edges of the blade are located in slightly different locations along the blade relative to each other. Additionally, the sets and set patterns do not align. It is believed that these differences, even though they may be slight, account for the early wear and failure of known double-sided hack saw blades as discussed above.

Accordingly, the set pattern of the first cutting edge 14 is "timed", or substantially aligned, with the set pattern of the second cutting edge 16. Thus, the set patterns are timed with each other when, for example, the tooth tip or start location of a set pattern on one side of the blade is located approximately the same distance from one end of the blade or other index or reference point as is the tooth tip or start location of the set pattern on the other side of the blade. Alternatively, the set pattern of the first cutting edge 14 may be approximately 180 degrees out of phase with, i.e., may be the mirror image of, the set pattern of the second cutting edge 16. When the set patterns of the first and second cutting edges 14, 16 are so timed or out of phase, the points of maximum set magnitude "MSM" formed by the teeth on opposing sides, i.e., cutting edges, of the blade body 12 are aligned with one another (i.e., located approximately the same distance from the common reference point or location on the blade). For example, as shown in FIGS. 2 and 3B, teeth 22a, 22a' define a left MSM and are located at the same distance "Z" from a reference point on the blade, e.g., the end of the blade 10. As should be understood and appreciated by those of ordinary skill in the art in view of the teachings herein, the points of MSM can be aligned or timed in other ways.

When the cutting edges are timed, the directions of set also match. For example, a right set tooth R along one cutting edge is located at an opposing side of the blade body 12 from a right set tooth R of equal set along the other cutting edge, and the locations of the maximum set magnitudes of each of those opposing teeth are aligned at the same location along the length of the blade body 12. Likewise, a left set tooth L along one cutting edge is located at an opposing side of the blade body 12 from an equally left set tooth L along the other cutting edge, and the locations of the maximum set magnitudes of each of those opposing teeth are aligned at the same location along the blade.

Alternatively, when the two cutting edges are approximately 180 degrees out of phase, the points of maximum set magnitude "MSM" along one cutting edge are still aligned with the points of maximum set magnitude "MSM" along the other cutting edge, but the set directions are exactly the opposite or mirror images of one another. For example, a right set tooth R along one cutting edge is located at an opposing side of the blade body 12 from an equally left set tooth L along the other cutting edge, and vice versa.

In yet further embodiments, an example of which is shown in FIG. 2, the first and second cutting edges 14, 16 are indexed with each other, so that the first tooth of the set pattern on each cutting edge of the blade 10 is located substantially the same distance "D" from an indexing or reference point, such as, for example, an adjacent end of the blade 10. The indexing or reference point may, however, be any designated point on the blade 10. When the cutting edges are indexed, and a consistent pitch and toothform is used on each cutting edge, each tooth 22 is directly opposed from or located at the same point along the first cutting edge 14 as the corresponding tooth 22' along the second cutting edge 16. Where the set patterns are timed or out of phase with each other, this indexing, in turn, facilitates aligning the points of maximum set magnitude "MSM" of corresponding teeth 22, 22' on opposite sides of the blade.

As discussed above, the invention provides several advantages over the prior art. First, because the first cutting edge 14 and the second cutting edge 16 are identical (or are the mirror images of one another), as explained above, they are interchangeable. Once one cutting edge is worn out, the other cutting edge may be used to continue the same cutting. Additionally, as the inventors understand, as a cutting tooth is cutting into the work piece, the reactive forces, vibration and movement exerted by the work piece against the "cutting" teeth along the cutting edge 14, 16 are better opposed by the opposing cutting edge 16, 14 that is timed (or is 180 degrees out of phase) therewith. It is believed that the opposing timed tooth 22a, 22a' assists in counteracting the work piece forces and stabilizing the blade 10, which results in better cutting efficiency and tooth wear. Conversely, when the cutting edges 14, 16, are not timed (or are 180 degrees out of phase) as in the prior art, the opposing tooth may not be in contact with the work piece and thus provide reduced assistance to the cutting tooth.

To manufacture the blades of the invention, the inventors overcame a number of obstacles. It is difficult, using conventional manufacturing techniques, to obtain aligned or indexed cutting edges. For example, if the first cutting edge is machined (e.g., milled or punched) and/or set and then the second cutting edge is machined and/or set, it is unlikely to consistently machine or set corresponding cutting teeth on opposing sides of the blade at the same location along the blade that have the same set pattern and magnitude, i.e., are aligned. This is because the slightest difference in location of where each side of the blade body is fed or placed into a milling and/or setting machine will result in teeth and set patterns that are not aligned as well as having differing set magnitudes and/or points of MSM. In that case, as discussed above, the two cutting edges will not cut the same. Also, the blade will be less stable during cutting.

Figure 4:
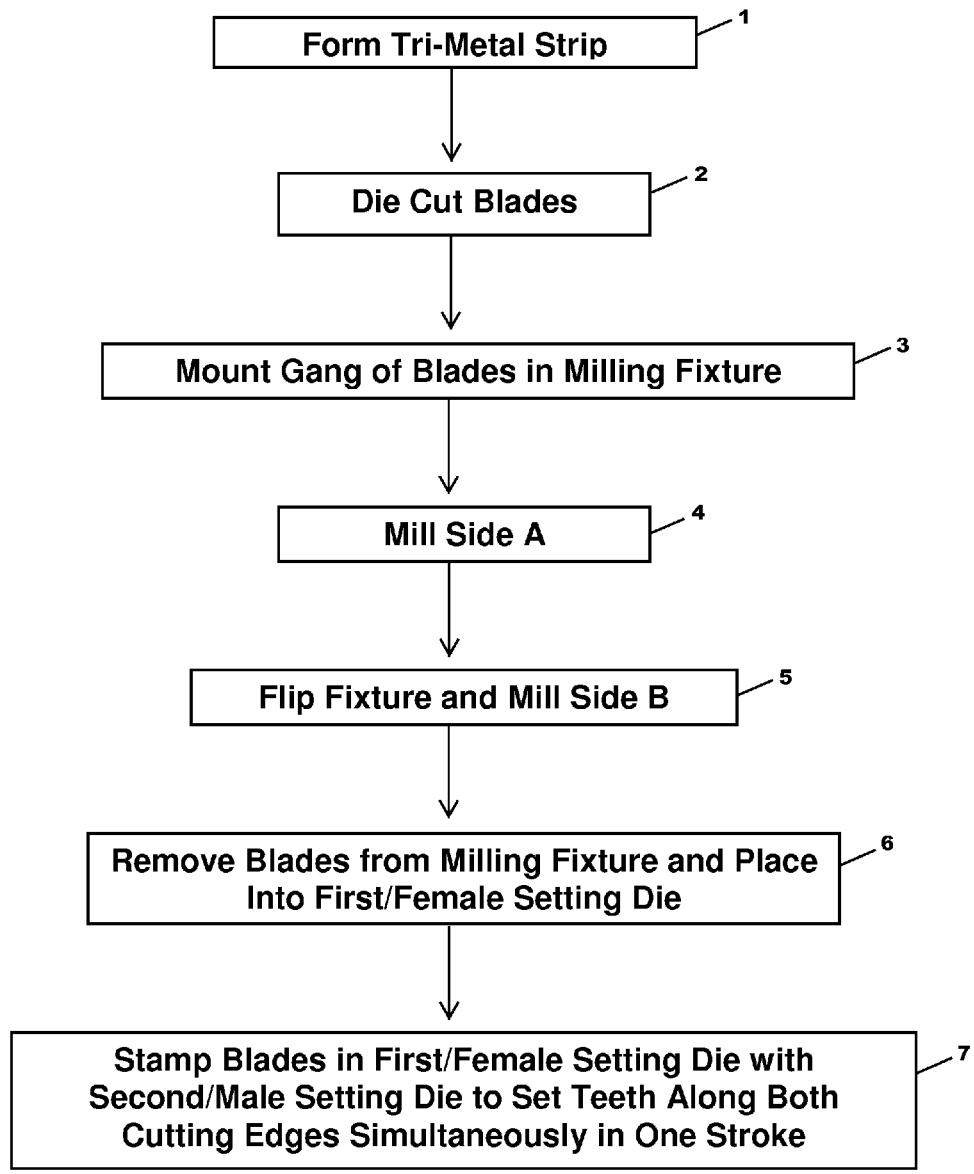
FIG. 4 is a schematic diagram of the steps for manufacturing the double-sided hack saw blade of FIG. 1.

Accordingly, double-sided hand hack saw blades in accordance with the invention can be manufactured as shown in the steps of FIG. 4. As shown in FIG. 4, a tri-metal strip is formed by welding high speed steel wires to opposing sides of the spring steel backing and heat treating the strip in step 1. In other embodiments, though, the strip can be formed by other methods as are known or may hereafter become known. In yet other embodiments, a tri-metal strip is not used, but rather, a conventional single material strip (e.g., carbon steel) or other composite strip is formed.

Thereafter, in step 2, individual blade bodies 12 are die cut or otherwise formed from the tri-metal strip. In some embodiments, the blade bodies are substantially identical, assisting in providing relatively consistent blades. Multiple blade bodies 12 are then mounted, e.g., side by side, in a milling fixture in step 3. Once in the milling fixture, the starting or first tooth location can be indexed the predetermined distance "D" from the designated indexing or referencing point, such as, for example, the adjacent end of each blade body 12. The teeth 22 are then milled into the first side of the blades bodies 12 in step 4, thereby creating the first cutting edge 14. In step 5, the milling fixture is flipped over with the blade bodies 12 mounted therein, and the second teeth 22' are milled into the second side of the blade bodies 12, to create the second cutting edge 16. If the starting tooth 22 was indexed prior to milling in step 4, then the starting tooth 22' is equally indexed in step 5, thereby maintaining the same indexing distance "D" for the starting tooth location between the teeth 22 and 22'. Accordingly, the teeth 22 along the first cutting edge 14 are located at the same location along the first cutting edge 14 with respect to the indexing or reference point as are the corresponding teeth 22' along the second cutting edge 16.

The blades 10 are then removed from the milling fixture and fed into a setting die in step 6. The setting die includes a first or female die for seating blade(s) 10 and a second or male die that is driven into engagement with the blade(s) 10 seated in the female die. In step 7, the teeth 22, 22' on both sides of the blade are simultaneously set with a single stroke of the male die. The male and female dies are configured to either set the teeth 22, 22' in a timed orientation or set teeth 22, 22' in a 180 degree out of phase orientation as discussed above. The simultaneous setting of the teeth 22, 22' along both cutting edges 14, 16 eliminates the inherent variation when setting one cutting edge first and setting the second cutting after. Further, if the teeth 22, 22' were indexed in steps 4 and 5, the first/female setting die indexes each set pattern from the same indexing/reference point designated in steps 4 and 5 to thereby ensure that the set patterns are properly timed to the tooth 22, 22' locations. Consequently, the set pattern along the first cutting edge 14 will directly oppose the set pattern along the second cutting edge 16.

The above-described process is but one example of manufacturing blades. Variations or other methods may be used to provide blades having the characteristics of the invention. For example, the alignment of MSM or indexing the teeth may be obtained by other manufacturing methods, as will be appreciated by those of ordinary skill in the art. The invention expressly contemplates various methods of manufacturing blades, and the invention is not limited to the particular manufacturing methods described herein.

In addition, as may be recognized by those of ordinary skill in the pertinent art based on the teachings herein, numerous changes and modifications may be made to the above-described and other embodiments of the invention without departing from its scope as defined in the claims. For example, the features of the invention such as, for example, the double-sided blade, the timing of the cutting edges and the indexing of the teeth are not limited to hack saw blades. The features of the invention also may be applied to reciprocating saw blades or other blades. Accordingly, this detailed description of currently preferred embodiments is to be taken in an illustrative, as opposed to a limiting sense.

What is claimed is:

1. A double-sided hand hack saw blade comprising:
   a blade body defining a first end and a second end and a length extending from the first end to the second end; and
   a first cutting edge defined by a plurality of cutting teeth located on one side of the blade body and defining a first tooth set pattern, and a second cutting edge defined by a plurality of cutting teeth located on an opposite side of the blade body relative to the one side of the blade body and defining a second tooth set pattern;
   wherein the first tooth set pattern and the second tooth set pattern each define a maximum set magnitude that are substantially the same as each other and aligned at a same point or location along the length of the blade body relative to a reference point, and are (i) timed to each other so that the aligned maximum set magnitudes are set in a same set direction as each other or (ii) approximately 180 degrees out of phase with respect to each other so that the aligned maximum set magnitudes are set in opposite set directions from each other.

2. The double-sided hand hack saw blade as defined in claim 1, wherein the first and second tooth set patterns define wavy tooth set patterns.

3. The double-sided hand hack saw blade as defined in claim 2, wherein the location of each tooth on the first cutting edge relative to a reference point on the blade body is in time with the location of each corresponding tooth on the second cutting edge relative to said reference point on the blade body.

4. The double-sided hand hack saw blade as defined in claim 3, wherein the first cutting edge defines a first tooth pitch or tooth location, the second cutting edge defines a second tooth pitch or tooth location, the first tooth wavy set pattern is timed to the first tooth pitch or tooth location, the second tooth wavy set pattern is timed to the second tooth pitch or tooth location, and the first tooth wavy set pattern is timed to the second tooth wavy set pattern.

5. The double-sided hand hack saw blade as defined in claim 3, wherein the first tooth set pattern defines at least one first point of maximum set magnitude and the second tooth set pattern defines at least one second point of maximum set magnitude, and the at least one first point of maximum set magnitude is either aligned with or approximately 180 degrees out of phase with the at least one second point of maximum set magnitude.

6. The double-sided hand hack saw blade as defined in claim 2, wherein the first cutting edge defines a plurality of first points of maximum set magnitude axially spaced relative to each other, the second cutting edge defines a plurality of second points of maximum set magnitude axially spaced relative to each other, and each first point of maximum set magnitude is either aligned with or approximately 180 degrees out of phase with a respective second point of maximum set magnitude.

7. The double-sided hand hack saw blade as defined in claim 6, wherein the first cutting edge defines a plurality of first points of maximum right set magnitude axially spaced relative to each other and a plurality of first points of maximum left set magnitude axially spaced relative to each other, the second cutting edge defines a plurality of second points of maximum right set magnitude axially spaced relative to each other and a plurality of second points of maximum left set magnitude axially spaced relative to each other, each first point of maximum right set magnitude is either aligned with or approximately 180 degrees out of phase with a respective second point of maximum right set magnitude, and each first point of maximum left set magnitude is either aligned with or approximately 180 degrees out of phase with a respective second point of maximum left set magnitude.

8. The double-sided hand hack saw blade as defined in claim 2, wherein the first cutting edge defines a first wavy set pattern to tooth pitch timing, the second cutting edge defines a second wavy set pattern to tooth pitch timing, and the first wavy set pattern to tooth pitch timing is approximately the same as the second wavy set pattern to tooth pitch timing.

9. The double-sided hand hack saw blade as defined in claim 8, wherein a first tooth of the first wavy set pattern is indexed at a first distance with respect to a reference point on the blade, a first tooth of the second wavy set pattern is indexed a second distance with respect to said reference point on the blade, and the first distance is approximately equal to the second distance to thereby time the first wavy set pattern to tooth pitch, time the second wavy set pattern to tooth pitch, and set such timing on the first and second sides of the blade approximately equal to each other.

10. The double-sided hand hack saw blade as defined in claim 1, wherein the maximum set magnitude of the first tooth set pattern is defined by a plurality of first points of maximum set magnitude axially spaced relative to each other along the length of the blade, and the maximum set magnitude of the second tooth set pattern is defined by a plurality of second points of maximum set magnitude axially spaced relative to each other along the length of the blade.

11. The double-sided hand hack saw blade as defined in claim 1, wherein the first tooth set pattern and the second tooth set pattern are (i) substantially identical or (ii) minor images of each other.

12. The double-sided hand hack saw blade as defined in claim 1, wherein each of the teeth of the first cutting edge and a corresponding one of the teeth of the second cutting edge are aligned at a same point or location along the length of the blade relative to said reference point.

13. The double-sided hand hack saw blade as defined in claim 1, wherein the reference point is defined by at least one of the first end and the second end.

14. A double-sided hand hack saw blade comprising:
a blade body defining a first end and a second end and a length extending from the first end to the second end; and
first means for cutting located on one side of the blade body defining a first wavy set pattern and second means for cutting located on an opposite side of the blade body defining a second wavy set pattern;
wherein the first wavy set pattern and the second wavy set pattern each define a maximum set magnitude that are substantially the same as each other and aligned at a same point or location along the length of the blade body relative to a reference point, and are either (i) timed with each other so that the aligned maximum set magnitudes are set in a same direction as each other or (ii) approximately 180 degrees out of phase with respect to each other so that the aligned maximum set magnitudes are set in opposite set directions from each other.

15. The double-sided hand hack saw blade as defined in claim 14, wherein the first means includes third means for cutting located along the first means indexed to a designated reference point along the blade body, and the second means includes fourth means for cutting located along the second means that is equally indexed to the same designated reference point along the blade body.

16. A method of manufacturing a double-sided hand hack saw blade comprising the steps of:
mounting at least one blade body defining a first end and a second end and a length extending from the first end to the second end in a milling fixture;
milling first and second cutting edges defined by a plurality of teeth along opposing edges of the at least one blade body;
removing the at least one blade body from the milling fixture and placing the at least one blade body into a setting die; and
substantially simultaneously setting the teeth on the first and second cutting edges and, in turn, forming a first tooth set pattern of teeth on the first cutting edge and a second tooth set pattern of teeth on the second cutting edge;
wherein the first tooth set pattern and the second tooth set pattern each define a maximum set magnitude that are substantially the same as each other and aligned at a same point or location along the length of the blade body relative to a reference point, and are (i) timed to each other so that the aligned maximum set magnitudes are set in a same set direction as each other; or (ii) approximately 180 degrees out of phase with respect to each other so that the aligned maximum set magnitudes are set in opposite set directions from each other.

17. The method according to claim 16, further comprising forming a plurality of blade bodies in separate piece form wherein each separate piece defines a respective blade body.

18. The method according to claim 17, wherein the step of forming a plurality of blade bodies comprises forming each blade body piece from a tri-metal strip and the step of forming the at least one blade body from the metal strip comprises die cutting the at least one blade body from the strip.

19. The method according to claim 18, wherein the setting step comprises setting the first and second cutting edges such that the first tooth set pattern and the second tooth set pattern are (i) timed with each another or (ii) approximately 180 degrees out of phase with respect to one another.

20. The method according to claim 18, wherein the setting step comprises forming a first wavy tooth set pattern of teeth on the first cutting edge and a second wavy tooth set pattern on the second cutting edge.

21. The method according to claim 18, wherein the milling step comprises milling the first cutting edge along a first side of the at least one blade body, flipping the milling fixture, and milling the second cutting edge along an opposing second side of the at least one blade body.

22. The method according to claim 21, wherein the step of milling the first cutting edge comprises indexing a first tooth of the plurality of teeth of the first cutting edge relative to a designated reference point along the at least one blade body, and the step of milling the second cutting edge comprises equally indexing a first tooth of the plurality of teeth of the second cutting edge relative to the same reference point along the at least one blade body.

23. The method according to claim 18, wherein the setting step comprises seating the at least one blade blade in a first die and stamping the at least one blade blade in the first die with a second die that cooperates with the first die and substantially simultaneously sets the first and second cutting edges with a single stroke to create the first and second tooth set patterns.

24. The method according to claim 23, wherein the milling step comprises indexing a first tooth of the plurality of teeth of the first cutting edge relative to a designated reference point along the at least one blade body, and equally indexing a first tooth of the plurality of teeth of the second cutting edge relative to the same reference point along the at least one blade body, and the setting step further comprises equally indexing the first and second tooth set patterns relative to the same reference point thereby timing the first and second tooth set patterns to the first and second cutting edges, respectively.

* * * * *